April 25, 1950  F. H. FLETCHER, JR  2,505,391
SEAL FOR CENTRIFUGAL MACHINES
Filed June 23, 1947  2 Sheets-Sheet 1
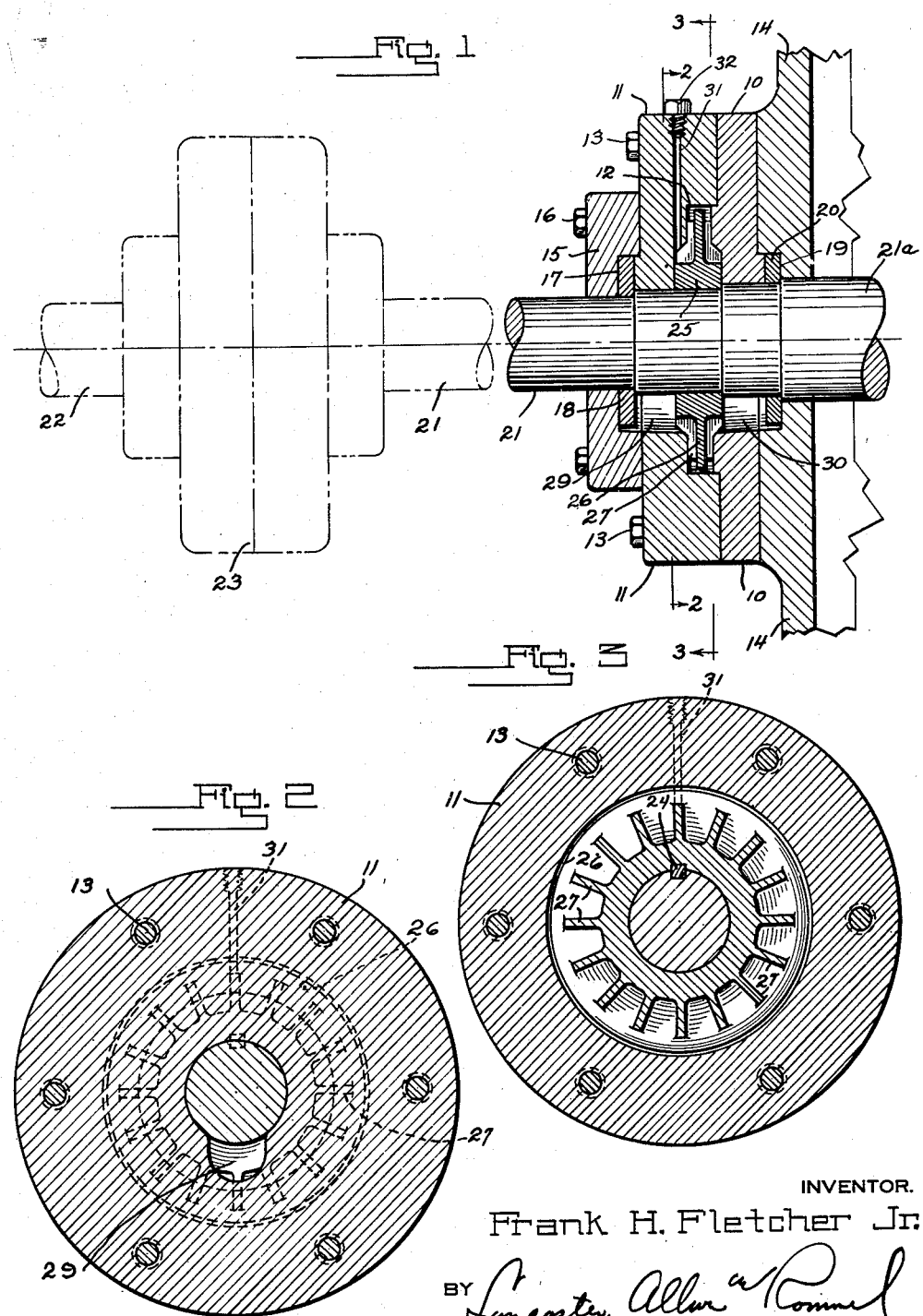
INVENTOR.
Frank H. Fletcher Jr.
BY Lancaster, Allen & Rommel
ATTORNEYS.

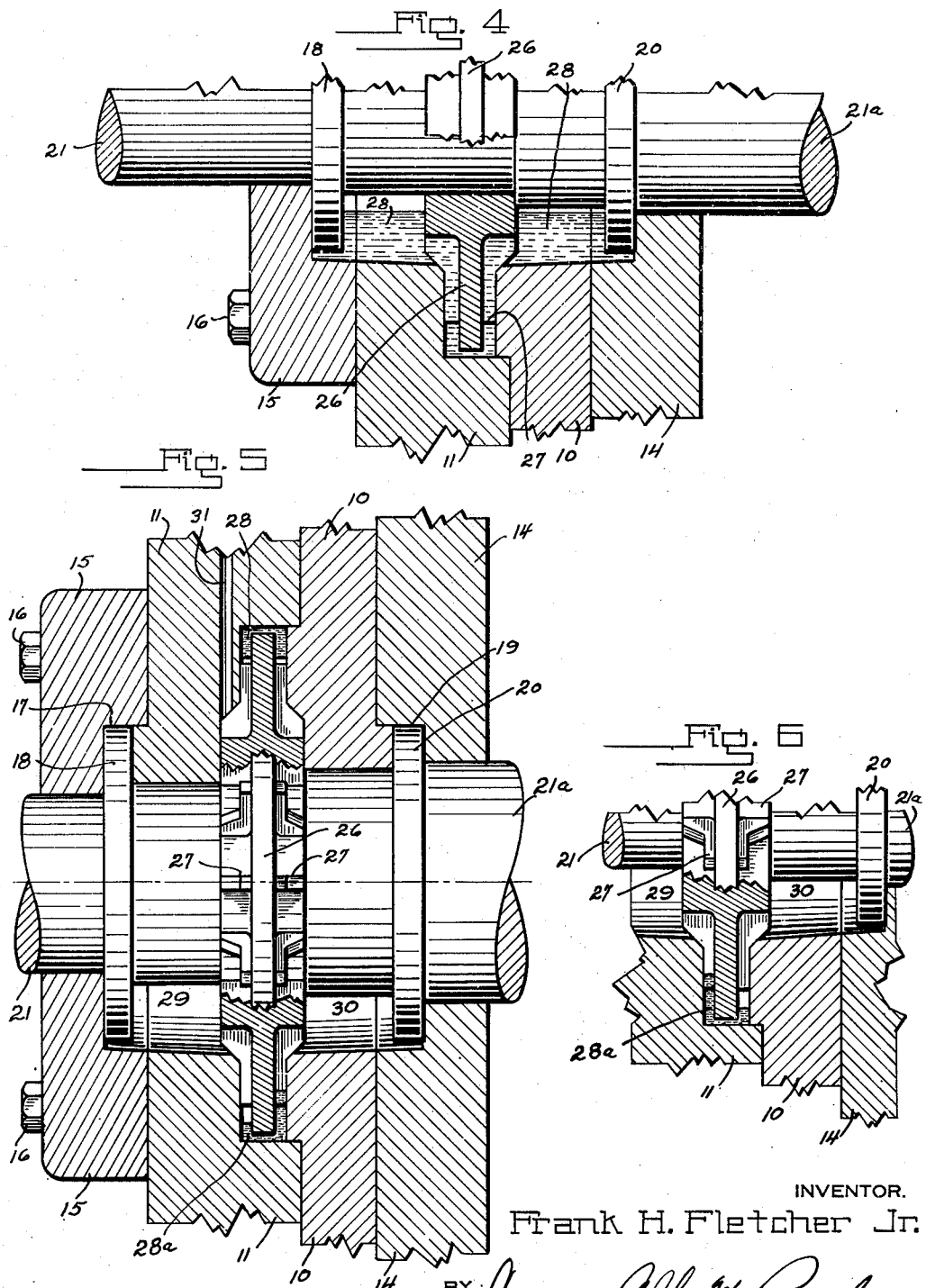

Patented Apr. 25, 1950

2,505,391

UNITED STATES PATENT OFFICE 2,505,391

SEAL FOR CENTRIFUGAL MACHINES

Frank H. Fletcher, Jr., Flushing, N. Y.

Application June 23, 1947, Serial No. 756,430

2 Claims. (Cl. 286—9)

This invention relates to sealing devices, and more particularly to a sealing device applicable to centrifugal machines, centrifugal pumps, turbines and the like, of which the opposite sides of a casing wall through which the shaft extends are exposed to different pressures.

The invention more specifically relates to a liquid centrifugal seal in which the liquid is rendered effective by centrifugal force to serve as a packing medium for the rotatable shaft, and in which the liquid is mercury.

A seal of this general type employing water, oil, or similar liquids is described in my application Serial No. 756,429 cocurrently filed herewith, for a Liquid seal.

The present invention, generally stated, comprises a device wherein the sealing is accomplished by a rotating seal disc packing for forcing the sealing liquid with a centrifugal force outward against the inner circumferential wall of a sealing chamber.

This seal has but one mechanical moving part, other than the sealing liquid, this part being the seal disc. This disc together with the sealing liquid provides an absolutely air tight seal subject to practically no wear, and no undue friction losses and constant replacement as are seals of the packing or stuffing-box type in which the packing material quickly wears causing the seal to leak and require shut-down of operation for replacement. Due to the minimum of friction, practically no wear, and automatic operation of this seal requiring no replacement of sealing liquid over long periods of time, it is dependable, efficient in operation and overcomes the objections to the packing or stuffing-box types.

The principal object of this invention is to provide an effective seal where considerable forces are involved between pressure or vacuum chambers containing rotatable elements and the exterior.

An object is to provide a simple and efficient mercury seal that will maintain an effective seal against either a vacuum or a pressure of high order.

A further object is to provide a mercury seal in which the sealing chamber and seal disc is constricted at the vital portions to permit satisfactory operation with a minimum of mercury and therefore low frictional lossses.

A further object is to provide a mercury seal which is automatic in operation and has ample space for storage of the excess mercury when not in operation.

A further object is to provide a seal disc of improved design or construction most effective for use with mercury as the sealing liquid.

Still further objects and advantages will be apparent from the following description, the claims, and the accompanying drawings in which:

Figure 1 is a sectional side elevation showing the seal members positioned with respect to the casing or housing and drive shaft of a machine, with the main drive shaft and coupling indicated, Figure 2 is a sectional face view taken along and viewed in the direction indicated by the arrows of line 2—2 of Figure 1, Figure 3 is a sectional face view taken along and viewed in the direction indicated by the arrows of line 3—3 of Figure 1, Figure 4 is a fragmentary side elevation of the seal members and shaft, showing the position of the mercury when the shaft and seal impeller is at rest, Figure 5 is a fragmentary side elevation of the seal and shaft, showing the position of the mercury when the shaft is rotating and fluid pressure is exerted from the left, and Figure 6 is a fragmentary side elevation, showing the position of the mercury when fluid pressure comes from the right.

As shown in Figure 1 the seal housing may consist of circular plates or walls 10 and 11 in which the circular seal chamber 12 is formed, bolted by means of cap screws 13 to a pump casing or housing 14. A cap 15 secured to plate 11 by means of cap screws 16 is provided with a recess 17 for the throw ring 18, while a recess 19 in the pump casing 14 is provided for the other throw ring 20.

A pump shaft 21, turned with stepped portions, is suitably driven by means of any prime mover connected to drive shaft 22 through coupling 23, and the pump impeller or other device to be driven is secured to the pump shaft portion 21a. In the event the seal is to be applied to a steam turbine, for example, the shaft portion 21a will be the driving end and power will be transmitted via shaft 21, coupling 23 and shaft 22.

Secured to pump shaft 21, by means of a key 24 (Figure 3), is a seal impeller 25 having a disc or web portion 26 of slightly smaller diameter than that of the seal chamber 12, in which it rotates, and a plurality of perpendicular vanes 27 whose outer ends form a circle of slightly smaller diameter than that of the web 26.

The width of the vanes 27 is the same as the length of the seal impeller hub at their hub connected or inner ends and tapered toward their outer or free ends to closely fit the similarly shaped seal chamber 12 and thus provide a relatively large space adjacent the impeller hub for the mercury 28, constituting the sealing liquid shown in Figure 4, when the seal impeller is at rest and all of the mercury therefore in the lower part of the seal chamber and the reservoirs 29 and 30.

When the seal impeller is rotating the mercury 28 is thrown, by means of the impeller vanes 27 to the restricted outmost diametrical inner wall of the seal chamber. The narrowness of the portion of the seal chamber requires a minimum of mercury to seal the space between the outer diametrical portion of the seal impeller web portion 26 and the walls of the seal chamber, the inner level of the mercury under these conditions being but slightly below the outer extremities of the vanes 27 in order that friction losses may be kept to a minimum while assuring an ample depth of mercury to permit the vanes 27 to continually force the mercury against the outer confines of the seal chamber and thus maintain an effective shaft seal.

Shaft 21 is diametrically stepped in order that the various parts of the seal which it supports may be readily assembled from one end and secured in proper operating position and accessible for inspection or replacement. Throw rings 18 and 20 of suitable material are provided to prevent any excess mercury from creeping along the shaft. Such mercury as may reach the throw rings is returned to the main reservoirs 29 and 30.

The main mercury reservoirs 29 and 30 (Figure 5) together with the lower half of the restricted and flared portions of the seal chamber 12 contains the entire amount of mercury when the shaft 21 is inoperative, and the mercury level when at rest should be but slightly below the lowest part of the shaft opening in the wall of the pump casing 14 in order to prevent any possible loss of mercury along the stationary shaft. The size of the reservoirs 29 and 30, together with the size of the lower portion of the seal chamber and the seal impeller, should be such as will accommodate only sufficient mercury when the seal impeller is at rest as will be required for efficient operation when the impeller is rotating at mercury throwing speeds.

A bore or channel 31 provided with a closing cap screw 32 is arranged in plate 11 to permit the required amount of mercury to be placed and maintained in the seal chamber and mercury reservoirs.

It will be readily seen that that seal of this invention may be constructed as a unit and readily mounted and assembled on the outside wall of a machine whose shaft is to be sealed and that the seal may be readily opened for inspection, repairs or replacements, if necessary.

In Figure 5 the level of the mercury 28a is indicated with the impeller rotating at high speed in which case the reservoirs 29 and 30 are drained or empty and the mercury all confined to the narrow portion of the seal chamber. In this view the level of the mercury 28a on either side of the impeller 25 indicates the existence of vacuum or suction from the pump impeller chamber into which the shaft end 21a extends.

In Figure 6, with conditions otherwise the same as in Figure 5, the level of the mercury 28a indicates a pressure coming from a pump or turbine chamber into which the shaft end 21a extends.

It will be readily understood that whereas water or other suitable liquid could be used in the seal chamber, the use of mercury is necessary where heavy pressures are to be sealed against escape either into or from within the pump chamber. It will also be understood that the vanes on the seal impeller are necessary to force the relatively heavy mercury to the area adjacent the periphery of the seal impeller web and to maintain it there with sufficient centrifugal force as will overcome heavy fluid pressures seeking escape along the drive shaft.

In the construction illustrated there is practically no loss of mercury and the entire operation of the seal, after receiving a proper supply of mercury, is automatic with minimum frictional losses and requiring a minimum of attention after being set up.

For purposes of definition it will be understood that wherever the noun "fluid" is used herein it refers to the dictionary definition of a gas or liquid.

While the preferred embodiment of this invention has been shown for purposes of illustration, it is to be clearly understood that various changes in details of construction and arrangement of parts may be made without departing from the scope of the invention as set forth in the appended claims.

What is claimed is:

1. The combination, in a machine having a wall, a rotatable shaft extending horizontally through said wall, a shaft seal comprising means on said wall forming a chamber adapted to contain mercury and surrounding said shaft to be sealed, a vertically disposed impeller in said chamber mounted on and rotatable with said shaft and adapted to develop due to centrifugal force in said mercury a sealing force between said impeller and the wall of said chamber, and means for automatically storing the excess mercury when said seal impeller is stationary, comprising the surface of an axially extending reservoir formed directly in the wall of said chamber with the upper limit of said reservoir ending at the lowermost surface area of said shaft.

2. In a housing for a liquid seal, walls defining a combined horizontal shaft portion and impeller accommodating and liquid seal chamber and having axially aligned shaft-accommodating openings, one of said housing walls being provided with means to store by gravity a volume of said liquid seal when the shaft portion and impeller are stationary, including the surface of a liquid seal reservoir, merging into the surface of said chamber, said entire reservoir surface being wholly below a horizontal plane through said shaft portion and extending upwardly to said shaft portion.

FRANK H. FLETCHER, Jr.

REFERENCES CITED

The following references are of record in the file of this patent:

UNITED STATES PATENTS

| Number | Name | Date |
|---|---|---|
| 773,297 | Nash | Oct. 25, 1904 |
| 1,346,926 | Wilfley | July 20, 1920 |
| 1,558,630 | Reed | Oct. 27, 1925 |
| 1,575,818 | Carrier | Mar. 9, 1926 |
| 1,590,778 | Schein | June 29, 1926 |
| 1,932,214 | Hornschuch | Oct. 24, 1933 |
| 2,136,799 | MacLean | Nov. 15, 1938 |
| 2,153,537 | Heath et al. | Apr. 11, 1939 |

FOREIGN PATENTS

| Number | Country | Date |
|---|---|---|
| 39,306 | Norway | of 1924 |